Feb. 10, 1953

J. HIRSHSTEIN 2,627,610

NONCLOG FLOW CONTROL DEVICE

Filed March 30, 1950

INVENTOR.
JOSEPH HIRSHSTEIN
BY Fay, Godrick & Fay

ATTORNEYS

Patented Feb. 10, 1953

2,627,610

UNITED STATES PATENT OFFICE 2,627,610

NONCLOG FLOW CONTROL DEVICE

Joseph Hirshstein, Cleveland, Ohio, assignor to Ruth R. Newman and Mildred P. Hirshstein Application March 30, 1950, Serial No. 152,959

4 Claims. (Cl. 4—255)

The present invention relates to improvements in fixed orifice flow controls for grease interceptors and the like.

An object of this invention is to provide a nonclog orifice flow control.

Another object of this invention is the provision of a fixed orifice flow control in which accumulations of grease or like material in the orifice may be readily removed so that the flow control remains substantially constant. Other objects and advantages of the invention are apparent in the following specification and drawings of the invention.

It is of importance for the proper operation of apparatus placed in liquid lines for the separation of grease from waste water or for the separation of liquids of different specific gravities, that the flow of liquid into the separating apparatus be kept within the capacity of the apparatus. For the attainment of this control, there is often interposed between the separator and the apparatus being drained a flow control device which incorporates a fixed orifice as a means of throttling the liquid flow.

During the course of service such an orifice is liable to partial obstruction or diminution of flow area by the deposition of grease or other material contained in the fluid passing therethrough. Such a deposit tends to form in the orifice or around the edges thereof, thereby decreasing the flow capacity of the orifice. In addition to the decrease in orifice size, additional turbulence induced by irregularities in the surface of the accumulations causes a decrease in the efficiency from the hydraulic standpoint.

The present invention supplies a simple means by which the orifice of such a device may be periodically cleaned or cleared as needed without the necessity of dismantling the apparatus or of interrupting service.

Figure 1:
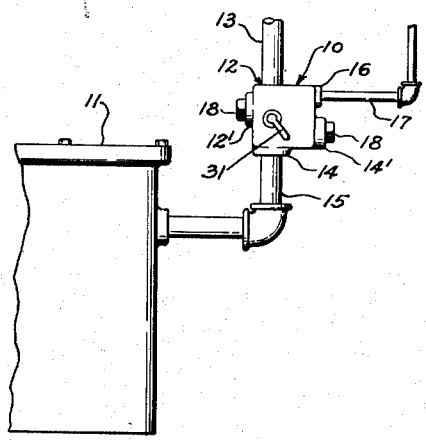
Fig. 1 shows the device of this invention installed in the inlet line of a grease interceptor.
Figure 2:
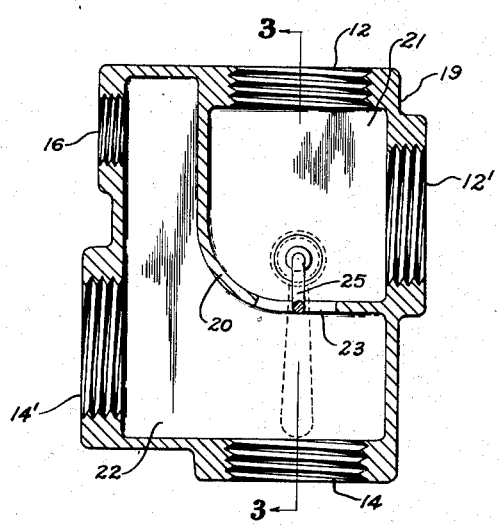
Fig. 2 is a vertical cross-section of the device of this invention taken along the line 2—2 of Fig. 3.

In Fig. 1 the control orifice fixture of this invention, indicated in general by the reference numeral 10, is shown as connected to a grease interceptor 11. Waste water enters the control fixture 10 at inlet 12 by piping 13, and is carried from outlet 14 to the interceptor by outlet piping 15. An air vent 16 is connected to air intake piping 17. An alternate inlet 12' and alternate outlet 14' are here closed by plugs 18. The internal construction of the control device is shown by Fig. 2, a vertical section taken at 2—2 in Fig. 3 through the center-lines of the several aforementioned inlets and outlets. The metal body 19 is provided with threaded apertures for the inlets 12 and 12', outlets 14 and 14', and air vent 16. An internal wall or partition 20 divides the interior of the body into the inlet chamber 21 and the outlet chamber 22. An orifice 23 is provided in the wall 20, by which the inlet chamber 21 communicates with outlet chamber 22. The orifice size is determined by the flow capacity for the determination of which the device is designed.

The alternate inlet and outlet, 12' and 14' are provided to render the control device more flexible in installation. This is particularly advantageous since the control fixture must be installed in the vertical position shown in the drawings, so that the air vent 16 leading into the outlet chamber 22 will be disposed to the side and in the uppermost position.

In the inlet chamber there is provided (Fig. 3) an arcuately formed orifice cleaner 24, the curved portion 25 of which is shaped as hereinafter described with relation to the size of the orifice. The straight shank portion or shaft 26, provided with a flange 27, extends through and is journalled in the bushing 28, threaded into the wall of body 19. The bushing 28 is counter-bored and threaded to receive the packing gland 29 and the packing material 30 interposed in the usual fashion about shank 26 between bushing 28 and packing gland 29.

The outer end of shank 26 is provided with a handle 31 fastened thereto by a set screw 32. To maintain the position of the orifice cleaner insofar as axial movement of the shank is concerned, the flange 27 is fixed with respect to axial movement on the shank 26 and its bears against the inner surface of bushing 28. After the packing gland 29 is adjusted to seal the device from water leakage, the handle 31 is adjusted inwardly and positioned by the set screw 32, so that axial movement of the orifice cleaner is restrained. When the device is put in service only one inlet and one outlet opening are of course used. The unused openings are closed with plugs 18 as is apparent in Fig. 1.

Figure 3:
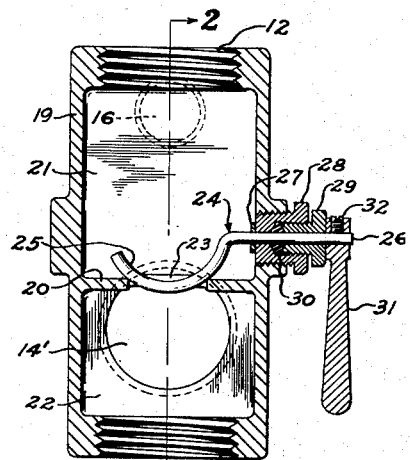
Fig. 3 is a vertical section taken along the line 3—3 in Fig. 2.

The cleaning device 24 is so shaped that, as it is revolved by means of handle 31, the arcuate portion 25 sweeps down into the orifice 23 as shown in Fig. 3, thereby loosening and removing material deposited in the orifice for the flowing liquid to carry it off. Thus occasional turning of handle 31 prevents the control orifice from clogging. Most effective cleaning is obtained by shaping and positioning the cleaner 24 so that the arcuate portion 25 comes in contact with the entire circumference of the inlet edge of the orifice at some part of its revolution.

Figure 4:
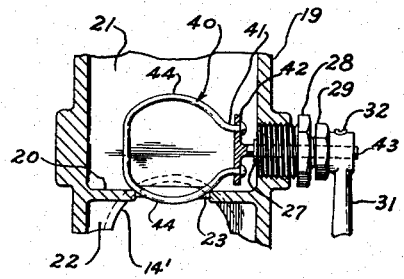
Fig. 4 is a partial sectional view taken similarly to Fig. 3, but showing a modified form of the orifice cleaner.

In the modification shown in Fig. 4 the cleaning device comprises a loop formed structure 40, the ends 41 of which are fixed to a cross piece 42, provided at the end of a straight shank 43 corresponding to the shank 26 in Figs. 2 and 3. The structure of the packing and bushing system is the same as that in Figs. 2 and 3, and the parts are similarly numbered. In this form of the invention, the cleaning device 40 and the two curved portions 44 are so formed with relation to the orifice 23 that the arcuate portions 44 both clean the orifice just as the arcuate portion 25 does in Figs. 2 and 3.

Figure 5:
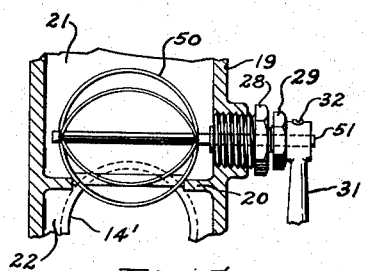
Fig. 5 is again a partial sectional view taken similarly to Fig. 3 but showing a second modification of the orifice cleaner.

The third form of cleaner shown in Fig. 5 embraces a plurality of arcuate curved members 50, the ends of which members are mounted in a straight shaft or shank 51. This form of the device is particularly useful for use with larger orifices. Here also the bushing or packing structure is like that of Figs. 2, 3 and 4 and the parts are similarly numbered.

I claim:

1. A liquid flow control fixture comprising a hollow body having an inlet, an outlet, and a wall interiorly dividing said body into an inlet chamber and an outlet chamber, said wall being provided with a flow control orifice between the said chambers; and a cleaning device including a shaft journalled in and extending through an outer wall of said fixture into the interior thereof, and transversely to said orifice, and an arcuately formed cleaning member on the inner portion of said shaft, said shaft and said member being so disposed that said member moves across said orifice substantially in contact with an edge thereof upon rotation of the shaft.

2. A liquid flow control fixture comprising a hollow body having an inlet, an outlet, and a wall interiorly dividing said body into an inlet chamber and an outlet chamber, said wall being provided with a flow control orifice between the said chambers; and a cleaning device including shaft journalling and sealing means in an outer wall of said fixture, a shaft extending through said means into the interior of the fixture and directed transversely to said orifice, an arcuately formed cleaning member carried by the inner portion of said shaft, said shaft and said member being so disposed that said member moves across said orifice substantially in contact with an edge thereof upon rotation of the shaft.

3. A liquid flow control fixture comprising a hollow body having an inlet, an outlet, and a wall interiorly dividing said body into an inlet chamber and an outlet chamber, said wall being provided with a flow control orifice between the said chambers, and a cleaning device including shaft journalling and sealing means in an outer wall of said fixture, a shaft extending through said means into the said inlet chamber and transversely to said orifice, an arcuately formed cleaning member on the inner portion of said shaft, said shaft and said member being so disposed that said member moves across said orifice substantially in contact with an edge thereof upon rotation of the shaft.

4. A liquid flow control fixture such as that described in claim 3 wherein said hollow body is provided with an air vent opening into said outlet chamber.

JOSEPH HIRSHSTEIN.

REFERENCES CITED

The following references are of record in the file of this patent:

UNITED STATES PATENTS

| Number | Name | Date |
|---|---|---|
| 1,079,555 | Hopewell | Nov. 25, 1913 |
| 1,454,346 | Stoll | May 8, 1923 |
| 2,046,569 | Madorin | July 7, 1936 |
| 2,163,358 | Swearingen | June 20, 1939 |
| 2,576,640 | Ramsey | Nov. 27, 1951 |